(12) United States Patent
Knights et al.

(10) Patent No.: US 6,492,043 B1
(45) Date of Patent: Dec. 10, 2002

(54) METHOD AND APPARATUS FOR DETECTING A LEAK WITHIN A FUEL CELL

(75) Inventors: Shanna D. Knights, Vancouver (CA); David P. Wilkinson, Vancouver (CA); Ruediger Nebelsiek, Stuttgart (DE); Jürgen Stumper, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/220,163

(22) Filed: Dec. 23, 1998

(51) Int. Cl.[7] .............................. H01M 8/04; H01M 8/10
(52) U.S. Cl. .............................. 429/13; 429/12; 429/22; 429/26; 429/30
(58) Field of Search .............................. 429/13, 12, 22, 429/26, 30

(56) References Cited

U.S. PATENT DOCUMENTS

| | | | |
|---|---|---|---|
| 5,230,966 A | 7/1993 | Voss et al. | 429/26 |
| 5,235,846 A | 8/1993 | Fanciullo | 73/40 |
| 5,284,718 A | 2/1994 | Chow et al. | 429/26 |
| 5,763,113 A | 6/1998 | Meltser et al. | 429/13 |

FOREIGN PATENT DOCUMENTS

| | | | |
|---|---|---|---|
| DE | 196 49 434 C | 1/1998 | |
| DE | 196 49 436 C1 | 11/1998 | |
| EP | 0 827 226 A2 | 3/1998 | |
| JP | 58-158872 | * | 9/1983 |
| JP | 59-149660 A | | 8/1984 |
| JP | 61-88463 | * | 5/1986 |
| JP | 61-279071 A | | 12/1986 |
| JP | 62-115670 A | | 5/1987 |
| JP | 63-110556 | * | 5/1988 |
| JP | 06-223850 A | | 8/1994 |
| JP | 08-185878 A | | 7/1996 |
| JP | 8-185879 | * | 7/1996 |

* cited by examiner

Primary Examiner—Patrick Ryan
Assistant Examiner—Jonathan Crepeau
(74) Attorney, Agent, or Firm—McAndrews, Held & Malloy, Ltd.

(57) ABSTRACT

A method detects fluid leaks within a fuel cell assembly. The method comprises (a) introducing a first supply fluid to a first fluid passage within the fuel cell assembly, wherein the first supply fluid comprises a tracer; (b) introducing a second supply fluid to a second fluid passage within the fuel cell assembly, wherein in the absence of a leak in the first fluid passage, the second fluid passage is fluidly isolated from the first fluid passage; and (c) monitoring a second fluid exhaust stream exiting from the second fluid passage and detecting when a concentration of the tracer is present within the second fluid exhaust stream.

38 Claims, 6 Drawing Sheets

METHOD AND APPARATUS FOR DETECTING A LEAK WITHIN A FUEL CELL

FIELD OF THE INVENTION

The present invention relates to a method of operating a fuel cell and a fuel cell apparatus. More particularly, the invention provides a method and apparatus for detecting a leak by monitoring at least one environment to detect when a tracer has escaped from a fluid passage to the monitored environment, which is otherwise fluidly isolated from the fluid passage in the absence of a leak.

BACKGROUND OF THE INVENTION

Electrochemical fuel cells convert reactants, namely fuel and oxidant, to generate electric power and reaction products. Electrochemical fuel cells generally employ an electrolyte disposed between two electrodes, namely a cathode and an anode. The electrodes each comprise an electrocatalyst disposed at the interface between the electrolyte and the electrodes to induce the desired electrochemical reactions.

Solid polymer fuel cells employ a solid polymer electrolyte, or ion exchange membrane. The membrane is typically interposed between two electrode layers, forming a membrane electrode assembly ("MEA"). The membrane is typically proton conductive, and acts as a barrier, isolating the fuel and oxidant streams from each other on opposite sides of the MEA. The MEA is typically interposed between two plates to form a fuel cell assembly. The plates act as current collectors and provide support for the adjacent electrodes. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies.

The fuel fluid stream which is supplied to the anode may be a gas such as, for example, substantially pure gaseous hydrogen or a reformate stream comprising hydrogen, or a liquid such as, for example, aqueous methanol. The fuel fluid stream may also contain other fluid components such as, for example, nitrogen, carbon dioxide, carbon monoxide, methane, and water. The oxidant fluid stream, which is supplied to the cathode, typically comprises oxygen supplied as, for example, substantially pure gaseous oxygen or a dilute oxygen stream, such as for example, air, which may also contain other components such as nitrogen, argon, water vapor, carbon monoxide, and carbon dioxide. Various sealing mechanisms are used to fluidly isolate the fuel and oxidant streams from one another in the fuel cell.

The electrochemical reactions in a solid polymer fuel cell are generally exothermic. Accordingly, a coolant is typically also needed to control the temperature within a fuel cell assembly to prevent overheating. Conventional fuels cells employ a liquid, such as, for example, water to act as a coolant. In conventional fuel cells, the coolant stream is fluidly isolated from the reactant streams.

Thus, conventional fuel cells typically employ three fluid streams, namely fuel, oxidant, and coolant streams, which are fluidly isolated from one another. See U.S. Pat. No. 5,284,718 and FIGS. 1, 2A and 2B of U.S. Pat. No. 5,230,966, which are incorporated herein by reference in their entirety, for examples of typical fuel cell assemblies configured to fluidly isolate the aforesaid three fluid streams. Fluid isolation is important for several reasons. For example, one reason for fluidly isolating the fuel and oxidant streams is a hydrogen-oxygen fuel cell is that hydrogen and oxygen are particularly reactive with each other. Accordingly, in solid polymer fuel cells, an important function of the membrane and plates is to keep the fuel supplied to the anode separated from the oxidant supplied to the cathode. The membrane and plates are, therefore, substantially impermeable to hydrogen and oxygen. However, since the membrane also functions as an electrolyte, the membrane is generally permeable to protons and water. (Water is generally required for proton transport in membrane electrolytes.)

The coolant fluid is preferably isolated from the reactants fluids to prevent dilution and contamination of the reactant streams. Furthermore, in a conventional fuel cell, it is undesirable to mix a liquid coolant, such as water, with a gaseous reactant such as hydrogen or oxygen. Water may cause flooding in the reactant fluid passages which prevents the reactants from reaching the electrochemically active membrane-electrode interface. It is also undesirable for the reactant streams to leak into the coolant stream because this reduces operating efficiency since the leaked reactants are not used to generate electrical power. Likewise, leakage of any of the fluids to the surrounding atmosphere is generally undesirable.

Accordingly, it is desirable to promptly detect fluid leaks in the fuel cell reactants or coolant fluid passages that may occur, for example, at the membranes, plates, or seals. Once a leak large enough to be an operational concern is detected, prompt corrective action may be taken. However, if the leak is not an immediate operational concern, the leak may be monitored until it does become a concern, or until the next regularly scheduled maintenance service (i.e., whichever occurs first). If action is required before the next regularly scheduled maintenance service, the fuel cell apparatus may be equipped with a mechanism that shuts off the supply of reactants to the defective fuel cell or to the fuel cell stack where the leak is detected. If the fuel cell or fuel cell stack is one unit of an array of fuel cell units, valves may be used to isolate the defective fuel cell unit from the other units so that they may continue to produce power, until it is convenient to repair or replace the isolated defective fuel cell units.

There are several conventional methods of detecting leaks. For example, in a hydrogen-oxygen fuel cell, the oxidant exhaust stream can be monitored to detect the presence of hydrogen. When hydrogen is detected in the oxidant exhaust stream, this may indicate a leak. A problem with this method is that hydrogen may be present in the oxidant exhaust stream for reasons other than a leak. For example, if there is a shortage of oxygen at the cathode, protons arriving at the cathode from the anode may recombine with electrons to form hydrogen. There are many possible causes for such an oxygen shortage. For example, an oxygen shortage may result from a sudden increase in power output demand, a malfunctioning compressor, a blockage in fluid flow field channels caused by an accumulation of product water, or a clogged air filter. An oxygen shortage may result in complete or partial oxygen starvation resulting in a reduction in cell voltage and the production of hydrogen by the combination of protons with electrons.

Unlike a leak where the typical response is to shut down the fuel cell, for an oxygen starvation problem, other corrective measures are available which do not involve shutting down the fuel cell. For example, the oxidant pressure could be raised, or the oxidant flow rate increased, to attempt to remove any accumulated water that may be plugging the flow field channels. Therefore, it is desirable to be able to distinguish between an oxygen starvation problem and a leak. However, without additional information, the detection of hydrogen in the oxidant exhaust is not, by itself, a clear indication that there is a leak. Accordingly, a disadvantage of using hydrogen detection as an indicator of leaks is that other operating parameters must also be monitored and measured to confirm that a leak is indeed the cause of hydrogen being detected in the oxidant stream.

An additional problem with using a constituent such as hydrogen, other reactants, or reaction products, as in indicator of a leak is that these constituents may be reactive within the fuel cell. These constituents may be particularly reactive in the presence of the electrocatalyst at the interfaces between the electrolyte and the anode and cathode. Consequently, these substances may react partially or completely prior to being exposed to a detector located in the fluid exhaust manifold. Thus, the concentration of any detected substances may not accurately reflect to the amount of the constituent substance that is leaking and may delay the detection of a leak.

When the fuel stream comprises carbon dioxide, a method of detecting leaks between the fuel and oxidant fluid streams involves detecting greater than a threshold level of carbon dioxide in the oxidant exhaust stream. A disadvantage of this method is that an oxidant supply stream, such as air, may already comprise carbon dioxide in varying concentrations. This may be especially true in vehicular applications where the oxidant intake may receive air comprising the exhaust streams of other vehicles. Therefore, a disadvantage of this method is that for reliable operation, it is necessary to measure the carbon dioxide concentration in the oxidant intake stream, as a reference, in addition to measuring the carbon dioxide concentration in the oxidant exhaust stream.

Another method of detecting leaks between the fuel and oxidant fluid streams is to measure the oxygen concentration in the fuel exhaust stream. Like the aforementioned methods, a problem with this method is that there are other potential sources of oxygen at the anode. For example, sometimes oxygen is introduced into fuel reformate supply streams to counter the effects of catalyst poisoning. Another source of oxygen at the anode is water that may be converted to oxygen, electrons, and protons at the anode when there is a shortage of fuel (i.e. fuel starvation). Therefore, a disadvantage of these oxygen detection methods is that other parameters must be analyzed to determine when the oxygen measured within the fuel exhaust stream is the result of fuel starvation, a leak, or residual oxygen that was added to the fuel supply stream.

Another problem with many conventional methods of detecting leaks in the operating fuel cells is that early detection of a leak is delayed if the detector is associated with the fluid stream with the higher total pressure. Although differences in the partial pressures for a specific fluid will eventually result in some fluid components from the low pressure side crossing over to the high pressure side, detection of a leak is more immediate if the monitored exhaust stream is the fluid stream with the lower fluid pressure. Despite this delay problem, other factors may favor having balanced pressures, or the total pressure being higher in the fluid stream that is being monitored for leaks. For example, it may be more desirable to have the total pressure higher on the oxidant side than the fuel side of the membrane, even though the oxidant exhaust is being monitored for fuel fluid constituents that may indicate a leak from the fuel side.

Fuel cells are also typically checked for leaks prior to operating the fuel cell to produce power, for example, during qualification tests. In this situation the fuel cell is not operating during the leak test. One method of checking for leaks is to introduce a gas into the inlet of one of the fluid passages while the outlet is sealed. The other fuel cell fluid passage inlets are sealed and the outlets are typically fluidly connected to a bubble tube. The volume of any gas that bubbles through the bubble tube is measured to determine if there is any leakage. A problem with this test is that it is difficult to administer with consistent results and the test is a time consuming one. Also, particularly with respect to the reactant fluid passages, the pressurization of only one reactant fluid passage may result in damage to the thin membrane electrolyte layer and/or other fuel cell components.

Accordingly, there is a need for a simple and reliable method of detecting a leak in a fuel cell. That is, a method which provides a rapid indication that there is a leak and does not require further analysis to ascertain whether there might be another cause for the detected abnormal condition.

SUMMARY OF THE INVENTION

In one embodiment, a method detects fluid leaks within a fuel cell assembly. The method comprises:

(a) introducing a first supply fluid into a first fluid passage within the fuel cell assembly, wherein the first supply fluid comprises a tracer;

(b) introducing a second supply fluid to the second fluid passage within the fuel cell assembly, wherein, in the absence of a fluid leak in the first fluid passage, the second fluid passage is fluidly isolated from the first fluid passage; and (c) monitoring a second fluid exhaust stream exiting from the second fluid passage and detecting when a concentration of the tracer is present within the second fluid exhaust stream.

As used herein, the term "tracer" means a constituent of a reactant or coolant fluid stream. The constituent is preferably a fluid that is not one of the fuel or oxidant reactants fed to the fuel cell nor a reaction product that may be present in the monitored passage in the absence of a leak in the first fluid passage. Alternatively, the constituent may be a secondary reactant that is much less reactive than the reactants, which are the primary fuel and oxidant reactants. For example, the tracer could be methane that is mixed with a larger proportion of a primary reactant, such as hydrogen. However, a tracer that is substantially chemically stable and inert (i.e. non-reactive) is preferred so that the tracer concentration detected in the monitored fluid passage is indicative of the quantity of tracer which has flowed through one or more fluid leaks. Thus the tracer is preferably substantially chemically non-reactive with the fuel cell components and other fluids within the fuel cell assembly.

The preferred fuel cell assembly is a solid polymer fuel cell assembly that comprises a solid polymer electrolyte. The fuel cell assembly may be a single fuel cell, or one of a plurality of fuel cell assemblies arranged in a stack, comprising common fluid manifolds for supplying and exhausting the first and second supply fluids from a plurality of respective first and second fluid passages.

In one embodiment of the method, one of the first and second supply fluids is a fuel stream and the other one of the first and second supply fluids is an oxidant stream. Alternatively, one of the first and second supply fluids may be a coolant stream and the other one of the first and second supply fluids may be a reactant stream (i.e., either an oxidant or fuel stream).

If the first supply fluid is an oxidant stream, the tracer may preferably be selected from the group consisting of helium, argon, nitrogen, carbon dioxide, and sulphur hexafluoride. If the first supply fluid is a fuel stream then the tracer may preferably be selected from the group consisting of methane, helium, argon, and sulphur hexafluoride.

A preferred method further comprises sending an output signal to a controller when a concentration of the tracer is detected within the second fluid exhaust stream. The output signal may be sent when a predetermined threshold concentration is detected. In this embodiment, the threshold concentration is selected with consideration to the particular characteristics of the fuel cell assembly being monitored, such as, for example, the size of the fuel cell assembly and the anticipated fluid flow rates and pressures. The threshold concentration may be selected so that it is representative of a leak flow rate which corresponds to a leak condition which indicates an operational concern. Alternatively, the output signal may be representative of the concentration of the tracer in the second fluid exhaust stream and the output signal is sent when any concentration of the tracer is detected. In this case, the controller may be programmed to trigger an alarm or responsive action when certain predetermined threshold concentration values are detected.

A preferred embodiment of the method further comprises adding the tracer to the first supply fluid. That is, in this embodiment, the tracer is not normally present in any of the fuel cell fluid streams so the tracer is added continuously, or periodically to the first fluid stream when the other fuel cell fluid streams are being monitored for the tracer. Since the tracer is not normally present within any of the fuel cell fluid streams, when the tracer is detected within the second fluid exhaust stream, the only source of the tracer is the first fluid stream to which the tracer was added. Accordingly, detecting the presence of the tracer in the second fluid exhaust stream is a clear indication that there is a fluid leak. Another advantage of employing a tracer which is not normally present within the fuel cell is that it is necessary to add only a small amount of the tracer to the first supply fluid, since the detection of any amount of the tracer in the other fluid streams is an indication of a fluid leak. Accordingly, the amount of tracer which is added need only be minute, compared to the amount of the first supply fluid to which it is added.

To reduce the time for detecting a leak, the method may further comprise maintaining the first supply fluid in the first fluid passage at a fluid pressure higher than the pressure of the second supply fluid in the second fluid passage. Although the partial pressure difference for the tracer component of the first and second fluid streams will eventually result in the transfer of some of the tracer from the first fluid stream to the second fluid stream, such a transfer is more likely to be detected sooner if the first fluid stream total pressure is higher than the total pressure of the second fluid stream.

In one embodiment of the method, the step of monitoring the second fluid exhaust stream is performed periodically. For example, monitoring may only be done during regularly scheduled maintenance periods when the fuel cell assembly is connected to a tracer supply and a tracer detector. In this embodiment, the tracer supply and tracer detector are normally detached from the fuel cell assembly. An advantage of this embodiment is that the same tracer supply and tracer detector may be used to check many different fuel cell assemblies for leaks.

If the fuel cell assembly is only periodically checked for leaks, the method may further comprise periodically increasing the pressure of the first supply fluid in the first fluid passage in coordination with the periodic monitoring of the second fluid exhaust stream. In this way, even though the first fluid stream may ordinarily have a lower total pressure than the second fluid steam, a leak may be detected more readily if the total pressure is temporarily raised during periodic leak tests.

In another embodiment of the method, the second supply fluid comprises a second tracer which is different from the first tracer. This embodiment of the method further comprises monitoring a first fluid exhaust stream exiting from the first fluid passage and detecting when a concentration of the second tracer is present within the first fluid exhaust stream. If the second tracer is not normally present in the second supply fluid, this embodiment may further comprise adding the second tracer to the second supply fluid.

Some fuel cell assemblies also comprise a third fluid passage, which, in the absence of a leak in the third fluid passage, is fluidly isolated from the first and second fluid passages. For example, fuel cell assemblies may have separate fluid passages for a fuel, an oxidant, and a coolant fluid stream. The method may be employed to detect fluid leaks between the first fluid passage and the third fluid passage by monitoring a third fluid exhaust stream exiting from the third fluid passage and detecting when a concentration of the first tracer is present within the third fluid exhaust stream. To check for fluid leaks from the third fluid passage into at least one of the first and second fluid passages, the third fluid may comprise a third tracer and the method may further comprise monitoring at least one of the first and second fluid exhaust streams and detecting when a concentration of the third tracer is present.

A corresponding fuel cell apparatus comprises:
  (a) a fuel cell assembly;
  (b) a first reactant supply that is fluidly connected to the first fluid passage for directing a first reactant fluid to the first electrode;
  (c) a second reactant supply which is fluidly connected to the second fluid passage for directing a second reactant fluid to the second electrode;
  (d) a coolant supply which is fluidly connected to the third fluid passage for directing a coolant fluid into direct thermal contact with at least one of the first and second plates;
  (e) a tracer supply fluidly connected to one of the first, second or third passages for introducing a tracer into a receiving fluid which is one of the coolant fluid or the first or second reactant fluids; and
  (f) a tracer detector in fluid contact with a monitored fluid passage which is one of said first, second, or third fluid passages other than a receiving fluid passage, the detector for detecting when a concentration of the tracer is present within the monitored fluid passage and emitting an output signal when the concentration is detected.

Preferably, the fuel cell assembly comprises a solid polymer electrolyte. The detector may be calibrated to emit an output signal when the detected tracer concentration is greater than a predetermined threshold value; or, the detector may detect a range of tracer concentrations and emit an output signal which is representative of the detected tracer concentration.

The fuel cell apparatus may further comprise a metering device located between the tracer supply and a location where the tracer is introduced to the receiving fluid, for controlling the amount of tracer introduced into the receiving fluid. The tracer is preferably mixed with the receiving fluid. The fuel cell apparatus may employ an injector or a mixer to facilitate mixing the tracer with the receiving fluid at the point where the tracer is introduced into the receiving fluid stream. In addition, the metering device may be used to control the introduction of the tracer so that it is only introduced into the receiving fluid periodically.

In an embodiment of the fuel cell apparatus, the tracer supply comprises a pressure vessel for containing the tracer. The pressure vessel may be refilled with tracer to maintain an adequate supply at a suitable pressure. In another embodiment, the tracer supply comprises a tank that is not a pressure vessel. Instead, a pump or compressor is located downstream of the tank and the pump or compressor is employed to raise the pressure of the tracer prior to injecting the tracer into the receiving fluid stream.

In a preferred embodiment, the tracer supply is readily detachable from the fuel cell apparatus. For example, if the receiving fluid includes a recirculated fluid, once a desired concentration of the tracer is present within the receiving fluid, the tracer supply may be detached from the fuel cell apparatus. When the fuel cell apparatus is periodically checked at regularly schedule service intervals, the concentration of the tracer in the receiving fluid may be checked to determine if more tracer needs to be added, in which case, the tracer supply may be re-attached. In another embodiment, the tracer supply is always connected to the fuel cell apparatus during normal operation. However, an advantage of the tracer supply being detachable is that is may be removed when it is empty and easily replaced with a fuel tracer supply which is readily attached to the fuel cell apparatus.

Like the tracer supply, the tracer detector may also be detachable. For example, if the fuel cell apparatus is only periodically checked for fluid leaks, the tracer detector need only be connected to the fuel cell apparatus while the leak test is being conducted. This is particularly advantageous since the same tracer detector can be used to test a number of different fuel cell assemblies, so that a separate tracer detector is not needed for each fuel cell apparatus.

The fuel cell apparatus may further comprise two tracer detectors. For example, a first tracer detector may be associated with a first end of the monitored fluid passage and a second tracer detector may be associated with an opposite, or second, end of the monitored fluid passage. Both the first and second tracer detectors emit a respective output signal when a concentration of the tracer is detected so that the presence of the tracer within the monitored fluid passage is signaled when the tracer is detected by at least one of the first and second detectors at respective ends of the monitored fluid passage. An advantage of this embodiment, is that if the fuel cell fluid stream flow directions are periodically reversed, no matter which direction the fluid stream is travelling, there is always one of the first and second tracer detectors in fluid contact with the exhaust fluid stream. If the reversing fluid stream is a recirculated fluid stream, then the two tracer detectors may be used to monitor increases in tracer concentration, or, alternatively, only one tracer detector is needed to detect the total tracer concentration in the monitored fluid stream. In a further embodiment, if the tracer detector is located in the exhaust fluid manifold downstream of the flow reversal mechanism, only one tracer detector may be required.

Yet another embodiment of the fuel cell apparatus comprises three tracer detectors, wherein each tracer detector is associated with a separate fuel cell fluid stream. That is, one tracer detector is associated with each one of the first, second, and third fluid passages. In this embodiment, valves may be used to periodically introduce the tracer into at least two different ones of the first, second and third fluid passages such that, at different times, the receiving fluid may be different ones of the first reactant fluid, the second reactant fluid, and the coolant fluid.

A method detects a fluid leak within a fuel cell that is not producing power. This method is useful when it is desirable to check the fuel cell apparatus for leaks prior to introducing reactants into the fuel cell fluid passages. For example, this method may be used as a qualification test in a fuel cell apparatus production line. In this method, the tracer need not be introduced with a reactant or coolant stream. In particularly, this method comprises:

(a) sealing fluid inlets and outlets of a first fluid passage of the fuel cell;

(b) introducing a tracer into the first fluid passage of the fuel cell; and (c) monitoring an environment which, in the absence of a fluid leak in the first fluid passage, is fluidly isolated from the first fluid passage and detecting when a concentration of the tracer is present within the environment.

For detecting internal leaks between fluid passages within the fuel cell, the monitored environment may be a second fluid passage within the fuel. To detect external leaks between a fuel cell fluid passage and the external environment, the monitored environment may be the surrounding environment outside the fuel cell.

Preferably the tracer is a fluid that is chemically unreactive with the fuel cell components. In this method, the tracer may be diluted by mixing the tracer with another chemically unreactive fluid. In the preferred method, the tracer is selected from the group consisting of helium, argon, nitrogen and sulphur hexafluoride.

To simulate fuel cell operating conditions, the tracer may be introduced into the first fluid passage until fluid pressure is about the same as anticipated pressure within the first fluid passage when the fuel cell will be operating to produce power. To further improve the simulated operating conditions, a fluid other than the tracer may be introduced into a second fluid passage until fluid pressure within the second passage is about the same as the anticipated pressure within the second fluid passage when the fuel cell will be operating to produce power. This precaution is particularly useful when the fluid passages being checked for fluid leaks are the oxidant and fuel fluid passages that are separated by a solid polymer membrane. Thin solid polymer membrane may be damaged by excessive pressure differentials across the membrane. Introducing test fluids to both sides of the membrane more accurately simulates actual anticipated operating conditions and reduces the pressure differential which might be caused by introducing only one pressurized test fluid into only one of the fluid passages.

In addition, this method may further comprise placing the fuel cell within a chamber and detecting when a concentration of the tracer is present within the chamber. In this embodiment, the monitored environment is the space within the chamber and a vacuum may be used to enhance the detection of external fluid leaks. Although external leaks may not be as damaging to the fuel cell apparatus, it is important to check for external leaks because such leaks reduce fuel cell performance and efficiency.

In all of the above-described embodiments of the novel method and fuel cell apparatus, the tracer is preferably substantially stable under typical fuel cell operating conditions, is substantially unreactive with the other fluids within the fuel cell and fuel cell components, is non-toxic, easy to detect, and inexpensive. Examples of possible tracers include helium, argon, methane, carbon dioxide, nitrogen, or sulphur hexafluoride. The tracer is preferably a fluid that is not consumed or produced anywhere within a fuel cell. For example, in a fuel cell that uses substantially pure hydrogen as the fuel, the tracer could be helium. In a fuel cell that uses substantially pure oxygen as the oxidant, the tracer added to a fuel stream could be nitrogen.

An advantage of the preferred method is that the detection of any amount of tracer within the monitored fluid steam is an immediate indication of a leak, since the preferred tracer is non-reactive with other fluids and fuel cell components, and the tracer is not normally present in the monitored fluid stream. Accordingly, it is only necessary to detect a small concentration of the tracer to indicate a fluid leak, and thus only a small concentration of the tracer is required in the source reactant or coolant fluid stream.

Detecting the mere presence of a tracer is generally simpler and easier than measuring the concentration of a reactant fluid such as hydrogen or oxygen. Nevertheless, it may still be desirable to detect the concentration of the tracer, for example, so as to assess the severity of the leak.

BRIEF DESCRIPTION OF THE DRAWINGS

The advantages, nature and additional features of the invention will become more apparent from the following description, together with the accompanying drawings, which illustrate specific embodiments of a fuel cell apparatus.

With reference to all of the FIGS., like numbers are used to denote like components.

DETAILED DESCRIPTION OF THE PREFERRED EMBODIMENTS

Figure 1:
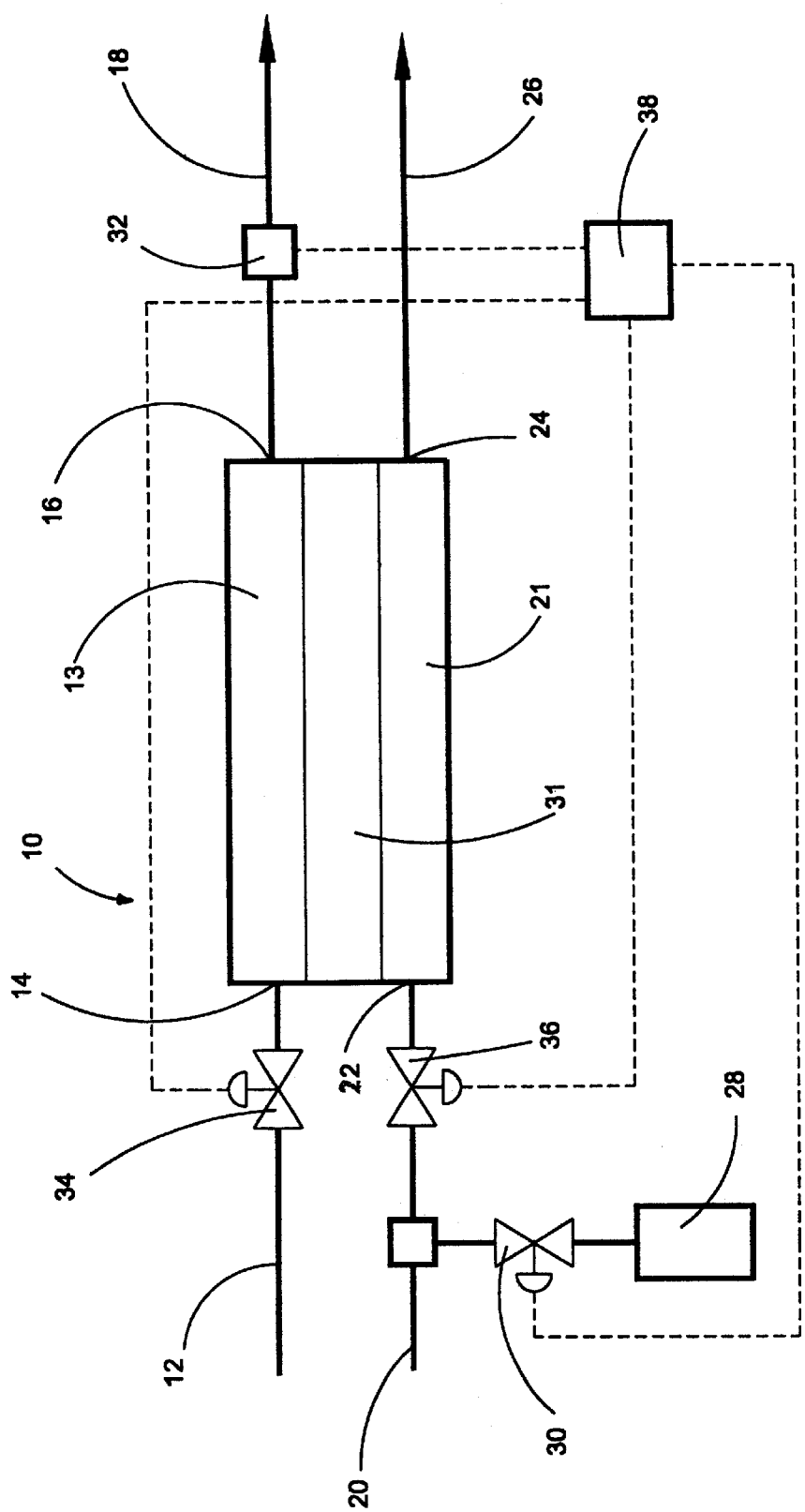
FIG. 1 is a schematic diagram showing a fuel cell apparatus comprising a tracer supply for supplying a tracer to a first fluid stream and a tracer detector for detecting the presence of a tracer in a second fluid stream.

The schematic diagram of FIG. 1 illustrates a fuel cell assembly 10 that is supplied with two fluid streams. Supply manifold 12 directs a first fluid stream to first fluid passage 13 within fuel cell assembly 10 through fuel cell inlet 14. The first fluid steam is exhausted from fuel cell assembly 10 through fuel cell outlet 16 to exhaust manifold 18. Supply manifold 20 supplies a second fluid stream to second fluid passage 21 within fuel cell assembly 10 through fuel cell inlet 22. The second fluid stream is exhausted from fuel cell assembly 10 through fuel cell outlet 24 to exhaust manifold 26.

Tracer supply 28 is fluidly connected to supply manifold 20 and valve 30 regulates the flow rate of the tracer that is introduced into the second fluid stream. Tracer supply 28 may comprise a pressure vessel or a tank at atmospheric pressure for storing a quantity of tracer. Tracer supply 28 may further comprise a pump or compressor for raising the pressure of the tracer prior to injecting it into second fluid passage 21. In addition to valve 30, a mixing device, such as for example, an injector (not shown) may be used to introduce the tracer to the fluid inside second fluid passage 21.

Within fuel cell assembly 10, the first fluid passage is fluidly isolated from the second fluid passage by barrier 31 which, depending upon the first and second fluid streams, may include one or more plates and/or MEAs which cooperate with other sealing mechanisms such as, for example, compression seals, gaskets, and/or adhesives for fluidly isolating the first and second fluid streams. Tracer detector 32 is associated with exhaust manifold 18 to detect the presence of the tracer in the first fluid stream that is exiting fuel cell assembly 10. When tracer detector 32 detects the presence of the tracer, this is an indication that there is a fluid leak between the first and second fluid passages.

Detection of a leak may trigger one or more responses. For, example, one response may be that tracer detector 32 emits a signal which triggers an alarm. Alternatively, another response may be to isolate fuel cell assembly 10 by operating valves 34 and 36 to cease supply of the first and second fluids. Tracer detector 32 may also detect the concentration of the tracer in the first fluid exhaust stream, and the response may depend upon the detect concentration. For example, tracer detector 32 may emit a signal which is representative of the detected tracer concentration; such a signal may be directed to controller 38 which processes the signal in accordance with pre-set threshold concentration values. For example, detached tracer concentration below a pre-set concentration threshold may not trigger any responsive action, whereas a tracer concentration higher than the pre-set concentration may trigger a warning or an alarm. More than one pre-set concentration threshold value may be employed. For example, if the tracer concentration rises above a higher pre-set concentration value, this may trigger controller 38 to operate valves 34 and 36 to isolate fuel cell assembly 10.

Figure 2:
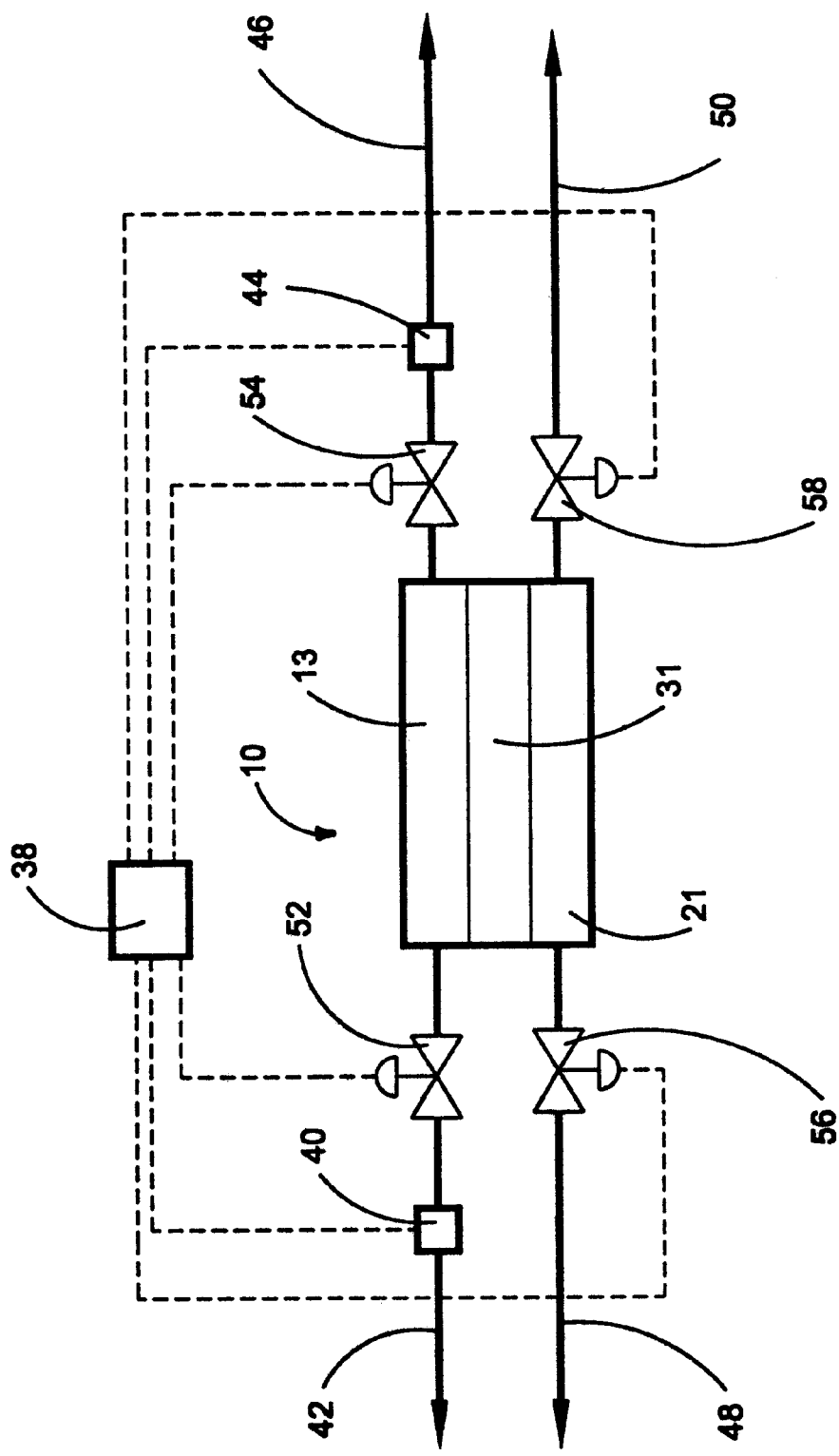
FIG. 2 is a schematic diagram showing tracer detectors for detecting the presence of a tracer in a fuel cell fluid steam in manifolds connected to both ends of a fuel cell assembly.

In some fuel cell assemblies, the fluid flow direction is periodically reversed, for example, for improved water management and/or counter-acting a temperature gradient across fuel cell assembly 10, which might be caused by flowing a fluid stream in only one direction. FIG. 2 shows fuel cell assembly 10 and tracer detectors 40 and 44 for monitoring a first fluid stream. In particular, tracer detector 40 detects the presence of a tracer within manifold 42 and tracer detector 44 detects the presence of a tracer within manifold 46. Manifolds 42 and 44 may alternate in their function as supply and exhaust manifolds if fluid flow direction of the first fluid stream is periodically reversed. A tracer is introduced into a second fluid stream that flows to and from fuel cell assembly 10 via manifolds 48 and 50. The tracer may be pre-mixed with the second fluid stream or added to the fluid stream from a tracer supply, as in the embodiment of FIG. 1. Alternatively, if the second fluid stream is recirculated, it may only be necessary to add tracer periodically, or at the outset, to maintain a desired tracer concentration.

One advantage of the embodiment illustrated by FIG. 2 is that, even if the flow direction is reversed, there is always a tracer detector that is downstream of fuel cell assembly 10 for detecting the presence of the tracer in the first fluid stream. In another variation of this embodiment, if the first fluid stream is recirculated, then only one tracer detector may be required.

In the embodiment of FIG. 2, tracer detectors 40 and 44 may emit output signals that are received and processed by controller 38. Controller 38 determines the proper response in accordance with pre-set criteria. For example, controller 38 may control valves 52, 54, 56, and 58 in response to the output signals emitted from detectors 40 and 44 and in accordance with pre-set threshold concentration values.

Figure 3:
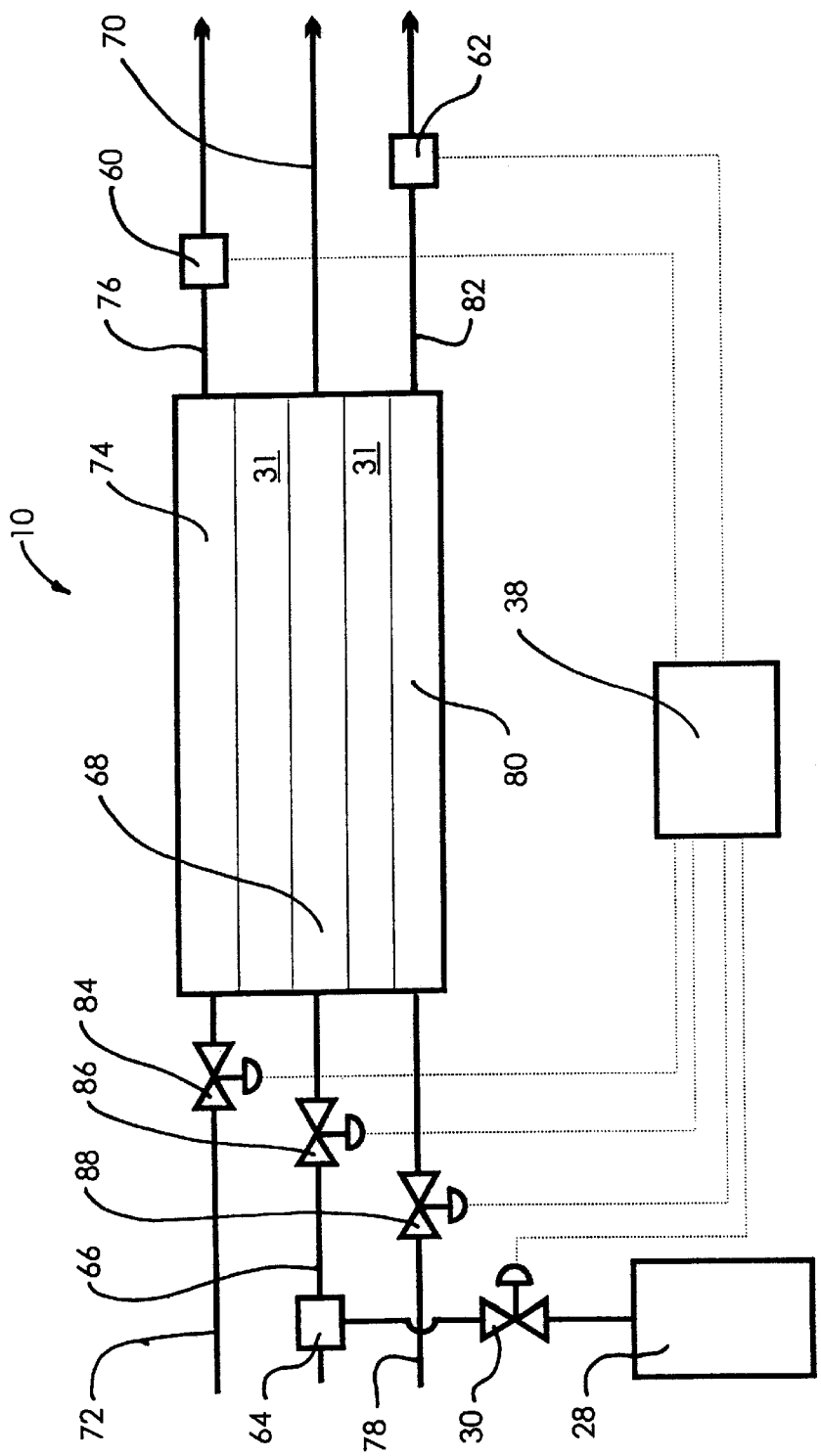
FIG. 3 is a schematic diagram showing a fuel cell apparatus comprising three fluid streams with tracer detectors positioned to detect the presence of a tracer in two of the fluid streams.

FIG. 3 illustrates an embodiment of a fuel cell apparatus that comprises three fluid streams with tracer detectors 60 and 62 positioned to detect the presence of a tracer in two of the fluid streams. A tracer supplied from tracer supply 28 is introduced into a first fluid stream using a mixer, such as, for example, an injector 64. Preferably, the first fluid stream is the fluid stream that ordinarily has the highest total fluid pressure, of the three fluid streams, when flowing through fuel cell assembly 10. Manifold 66 directs the first fluid stream to first fluid passage 68. The first fluid is exhausted from fuel cell assembly 10 through manifold 70. Manifold 72 directs the second fluid stream to second fluid passage 74. The second fluid stream is exhausted from fuel cell assembly 10 through manifold 76. Manifold 78 directs the third fluid stream to third fluid passage 80. The third fluid stream is exhausted from fuel cell assembly 10 through manifold 82. When the tracer is detected within one or both of manifolds 76 and 82, one or both of respective tracer detectors 60 and 62 emit a signal which may trigger an alarm and/or prompt controller 38 to initiate another response, such as actuating valves 84, 86, and 88 to shut down fuel cell assembly 10. Similar to the other discussed embodiments, if tracer detectors 60 and 62 emit signals which are representative of the detected concentration of the tracer, pre-set threshold tracer concentration values may be used to determine an appropriate response.

Figure 4:
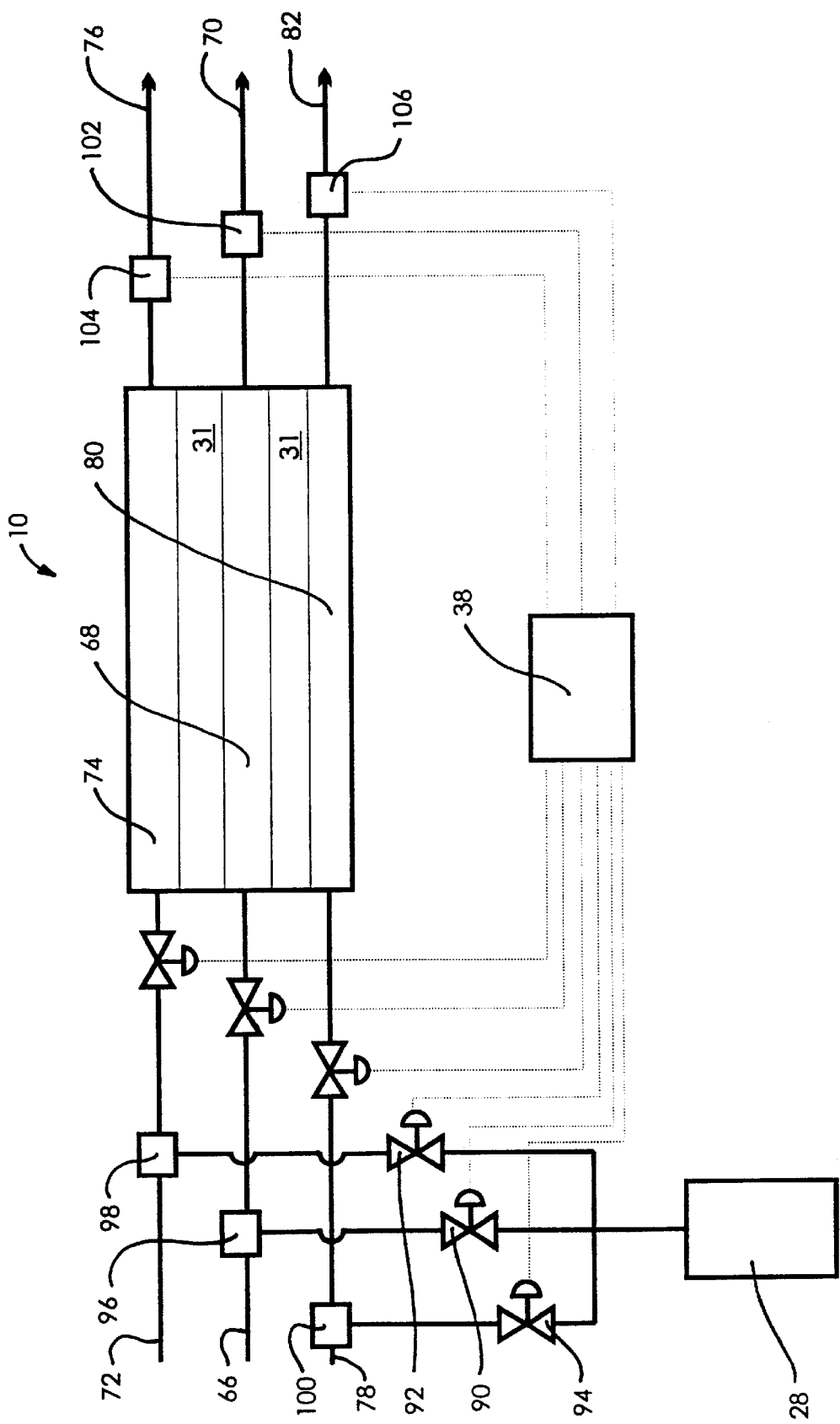
FIG. 4 is a schematic diagram showing a tracer supply which is fluidly connectable to any one of three different fuel cell fluid streams for periodically introducing a tracer into a selected fuel cell fluid stream, and tracer detectors for detecting the presence of the tracer in any one of the three fuel cell fluid streams.

FIG. 4 is a schematic illustration of another embodiment of a fuel cell apparatus. As in the embodiment of FIG. 3, there are three fluid streams supplied to fuel cell assembly 10. Each of the fluid streams is fluidly isolated from the other two fluid streams by barriers 31. However, in the embodiment of FIG. 4, tracer supply 28 is fluidly connectable to any one of the three fluid streams supplied to fuel cell assembly 10. Thus tracer may be introduced into any of the fluid streams using valves 90, 92, and 94 and respective mixers 96, 98, and 100. Alternatively, instead of using valves 90, 92, and 94, a flow diverter may be used to fluidly connect tracer supply 28 with one or none of fluid mixers 96, 98, and 100. Using this arrangement, the tracer may be periodically introduced into one of the three fluid streams, while the other two fluid streams may be monitored using the appropriate two of tracer detectors 102, 104, and 106. The fluid stream that is mixed with the tracer may also be monitored using the third tracer detector.

For example, the tracer may be introduced into the first fluid stream by opening valve 90. Valves 92 and 94 are kept closed. Tracer detector 104 monitors the second fluid stream within manifold 76 and emits an output signal if the tracer is detected. Tracer detector 106 monitors the third fluid stream within manifold 82 and emits an output signal if the tracer is detected. Tracer detector 102 monitors the first fluid stream within manifold 70. Because the tracer is mixed with the first reactant stream, if tracer detector does not detect the tracer, this indicates a problem with detector 102.

The embodiment of FIG. 4 permits the tracer to be introduced periodically to different fluid streams. For example, the tracer may initially be introduced into the first fluid stream as described above for a predetermined time. Then valve 90 may be closed, shutting off the flow the tracer to mixer 96. No tracer is introduced into any of the other fluid streams, at least until tracer detector 102 fails to detect any tracer in manifold 70, indicating that the tracer has been purged from first fluid passage 68. Then the tracer may be introduced into one of the other fluid streams, such as, for example, the second fluid stream, by opening valve 92. In this case, a leak is indicated by the detection of the tracer in one of manifolds 70 or 82 by respective tracer detectors 102 or 106.

As in the other embodiments, tracer detectors 102, 104 and 106 may be used to trigger alarms or to emit output signals to controller 38 for prompting an appropriate response in accordance with pre-set threshold concentration values.

To reduce the consumption of the tracer, in any of the embodiments, the tracer may be introduced only periodically, which may be, for example, during regularly scheduled maintenance. With any of the above-described embodiments, the tracer supply and the tracer detector(s) may be detachable from the fuel cell apparatus. For example, couplings could be used to provide connection points in the supply and exhaust manifolds for the fuel cell fluid passages. For periodic monitoring, the tracer supply and the tracer detector(s) are only attached when the fuel cell is being checked for leaks. An advantage of this embodiment is that the same tracer supply and tracer detector(s) may be used to check a plurality of fuel cells or fuel cell stacks for leaks, thus reducing amount of equipment needed.

Figure 5:
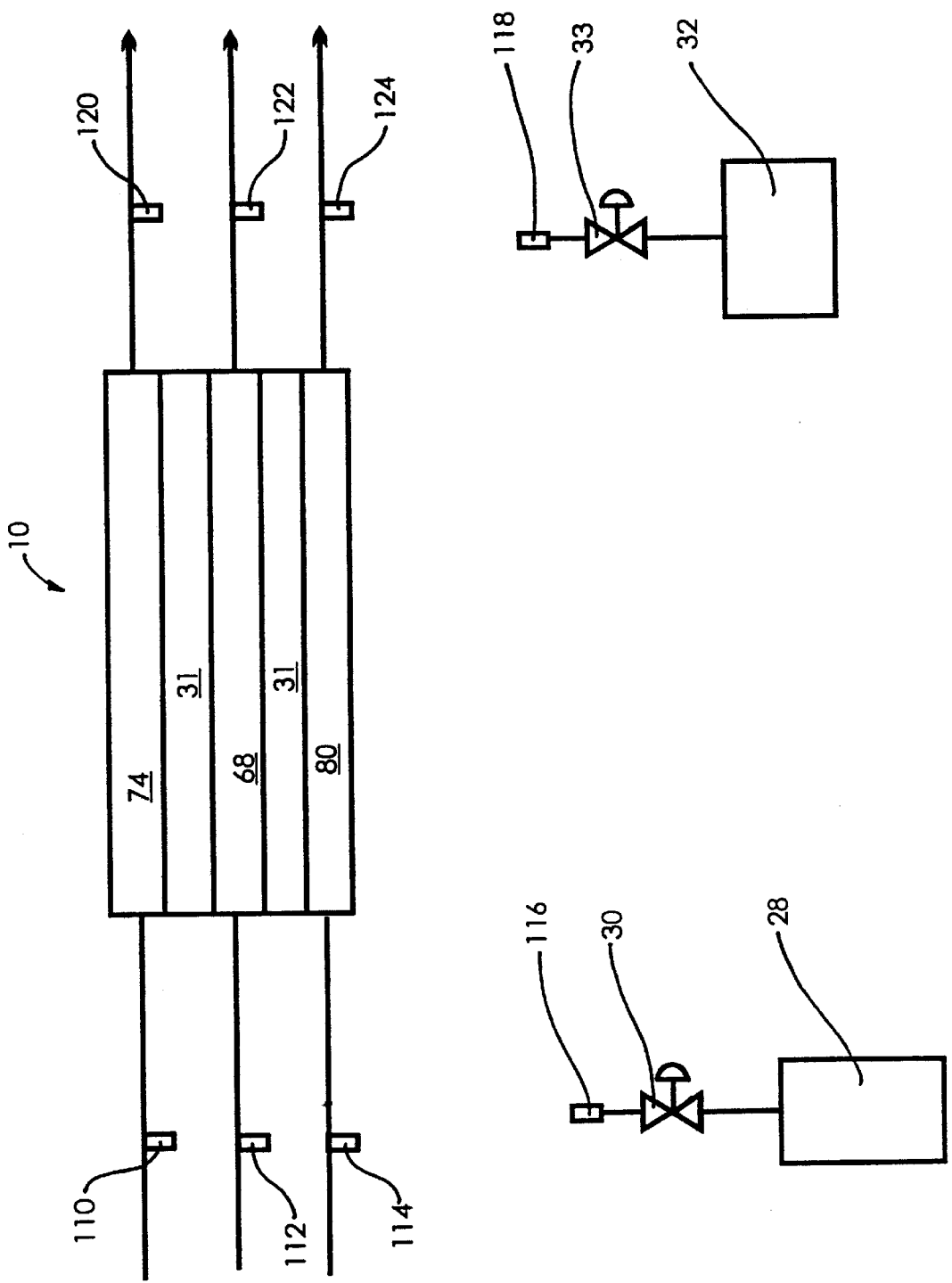
FIG. 5 is a schematic diagram showing a fuel cell apparatus with a detached tracer supply and a detached tracer detector. The tracer supply and tracer detector are attachable to locations on the fluid supply and exhaust manifolds where couplings are provided.

FIG. 5 is a schematic illustration of an embodiment of a fuel cell apparatus wherein tracer supply 28 and tracer detector 32 are each detachable from the fuel cell apparatus. Couplings 110, 112, and 114 may have integral valves, or alternatively, valves (not shown) may be attached to the couplings to prevent fluid leaks through the couplings when tracer supply 28 is detached. The integral valve of couplings 110, 112, and 114 may be biased in the closed position and automatically opened when coupling 116 is connected to a respective one of couplings 110, 112, and 114. Valve 30 seals tracer supply 28 when coupling 116 is not connected to one of couplings 110, 112, and 114. Tracer supply 28 may thus be introduced into any one of three fluid passages 68, 74, 80.

Tracer detector 32 is equipped with coupling 118, which is connectable to any one of couplings 120, 122 and 124. Couplings 120, 122, and 124 each have an integral valve, similar to couplings 110, 112, and 114, and/or separate valves (not shown). Tracer detector 32 may also be optionally equipped with isolation valve 33 to protect detector 32 and to prevent contaminants from entering it. Optionally, two detectors 32 may be used to monitor two different fluid streams for the tracer at the same time.

Preferably couplings 110, 112, and 114 are the same as couplings 120, 122, and 124. In addition to reducing the number of different kinds of parts, this affords flexibility so that detector 32 can be connected to one of couplings 110, 112, and 114 and tracer supply can be connected to one of couplings 120, and 122 or 124 if the fluid flow direction is reversed.

In the embodiments of FIGS. 1 through 5, an advantage of the method and apparatus is that it can be used to check for leaks while the fuel cell is producing power. However, the fuel cell need not necessarily be producing power. That is, these methods may also be employed while the fuel cell is not producing power. For example, the methods may be employed to check for leaks at start-up (before any power is produced), after the fuel cell has been shut down, or during maintenance periods.

Figure 6:
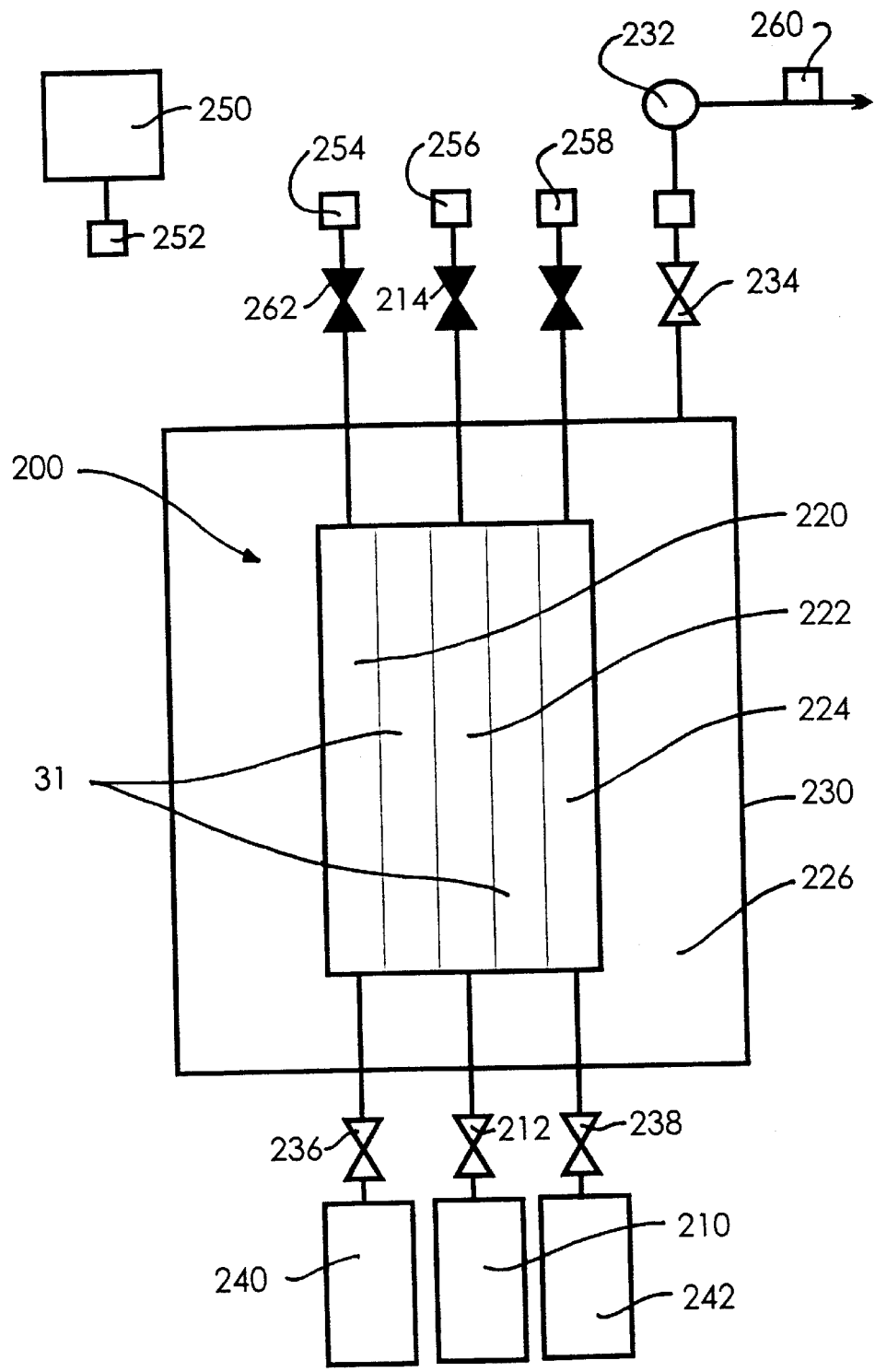
FIG. 6 is a schematic diagram showing an apparatus for using a tracer to check for leaks in a fuel cell stack that is not producing power.

FIG. 6 is a schematic illustration of an apparatus which may be used to check for leaks in a fuel cell assembly or fuel cell stack 200 which is not producing any power. In this situation, the tracer may be diluted but it is not typically mixed with a reactant or coolant. For example, this method could be used to check for leaks during qualification tests before the fuel cell or fuel cell stack is approved for service. Tracer supply 210 is fluidly connected via open valve 212 to fluid passage 222 of fuel cell stack 200. In the illustrated embodiment, valve 214 is closed. In the absence of any fluid leaks in fluid passage 222, it is fluidly isolated from fluid passages 220 and 224 and surrounding environment 226. Fuel cell stack 200 may be enclosed inside chamber 230 so that stack 200 may be tested for external fluid leaks. A vacuum may be created by vacuum pump 232, which is connected to chamber 230 via open valve 234.

To simulate anticipated fuel cell operating conditions, the tracer or a dilute tracer may be introduced into fluid passage 222 in the same pressure range anticipated during normal fuel cell operation. To simulate the anticipated pressure differential during normal operation, chemically unreactive test fluids may also be introduced into fluid passages 220 and 224 via open valves 236 and 238 from respective test fluid supply modules 240 and 242. When the reactant fluid passages are being leak tested, an advantage of this method is that, by introducing fluids into both reactant fluid passages, there is less change of damage being caused to the thin membrane by excessive pressure differentials.

To test for leaks, fluid passages 222, 224 and the surrounding environment 226 may be monitored to detect the presence of the tracer, using tracer detector 250. Tracer detector 250 has a coupling 252, which is connectable to couplings 254, 256, 258, and 260 so that any one of the fluid passages, or the surrounding environment may be monitored for the presence of the tracer. For example, when detector 250 is connected to coupling 254, valve 262 (shown closed), may be opened so that detector 250 is in fluid contact with the fluid within fluid passage 220.

After leak testing fluid passage 222, the tracer could be purged from fluid passage 222 and the tracer supply could be connected to another one of the fuel cell fluid passages to test it for leaks.

In any of the embodiments descried above, the fuel cell assembly may be, for example, a single cell, a stack, or an array of stacks. The fluid streams may each be fuel, oxidant, or coolant streams. Most commonly, it is desirable to monitor for leaks resulting in intermixing of the fuel and oxidant streams.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of detecting fluid leaks within a fuel cell assembly, said method comprising:
    (a) introducing a first supply fluid to a first fluid passage within said fuel cell assembly, said first supply fluid comprising a first tracer;
    (b) introducing a second supply fluid to a second fluid passage within said fuel cell assembly, said second supply fluid comprising a second tracer, wherein, in the absence of a fluid leak between said first fluid passage and said second fluid passage, said second fluid passage is fluidly isolated from said first fluid passage;
    (c) introducing a third supply fluid to a third fluid passage within said fuel cell assembly, said third supply fluid comprising a third tracer, wherein, in the absence of a leak in said third fluid passage, said third fluid passage is fluidly isolated from said first and second fluid passages;
    (d) monitoring a first fluid exhaust stream exiting from said first fluid passage and detecting when a concentration of at least one of said first tracer and said third tracer is present within said first fluid exhaust stream;
    (e) monitoring a second fluid exhaust stream exiting from said second fluid passage and detecting when a concentration of at least one of said first tracer and said third tracer is present within said second fluid exhaust stream; and
    (f) monitoring a third fluid exhaust stream exiting from said third fluid passage and detecting when a concentration of at least one of said first tracer and said second tracer is present within said third fluid exhaust stream.

2. The method of claim 1 wherein one of said first and second supply fluids is a fuel stream and the other one of said first and second supply fluids is an oxidant stream.

3. The method of claim 1 wherein one of said first and second supply fluids is a coolant stream and the other one of said first and second supply fluids is a reactant stream.

4. The method of claim 1 further comprising sending an output signal to a controller when a concentration of said at least one of said first tracer and said third tracer is detected within said second fluid exhaust stream.

5. The method of claim 4 wherein said output signal is representative of said concentration of said at least one of said first tracer and said third tracer in said second fluid exhaust stream.

6. The method of claim 1 wherein said fuel cell is a solid polymer fuel cell.

7. The method of claim 1 further comprising adding said first tracer to said first supply fluid.

8. The method of claim 7 further comprising adding said first tracer periodically.

9. The method of claim 1 further comprising maintaining said first supply fluid in said first fluid passage at a fluid pressure higher than the pressure of said second supply fluid in said second fluid passage.

10. The method of claim 1 wherein said first supply fluid is an oxidant stream, at least one of said first tracer and said second tracer is nitrogen, and said second supply fluid is a fuel stream.

11. The method of claim 1 wherein said second fluid exhaust stream is monitored periodically.

12. The method of claim 11 further comprising periodically increasing the pressure of said first supply fluid in said first fluid passage in coordination with said periodic monitoring of said second fluid exhaust stream.

13. The method of claim 1 wherein said first tracer and said second tracer are substantially chemically non-reactive with fuel cell components and other fluids within said fuel cell.

14. The method of claim 1 further comprising adding said second tracer to said second supply fluid.

15. The method of claim 1 wherein said fuel cell assembly is one of a plurality of fuel cell assemblies arranged in a stack comprising common fluid manifolds for supplying and exhausting said first and second supply fluids from a plurality of respective first and second fluid passages.

16. A method of detecting fluid leaks within a fuel cell assembly, said method comprising:
(a) introducing a first supply fluid to a first fluid passage within said fuel cell assembly, said first supply fluid comprising a first tracer;
(b) introducing a second supply fluid to a second fluid passage within said fuel cell assembly, said second supply fluid comprising a second tracer, wherein, in the absence of a fluid leak between said first fluid passage and said second fluid passage, said second fluid passage is fluidly isolated from said first fluid passage;
(c) monitoring a first fluid exhaust stream exiting from said first fluid passage and detecting when a concentration of said second tracer is present within said first fluid exhaust stream;
(d) monitoring a second fluid exhaust stream exiting from said second fluid passage and detecting when a concentration of said first tracer is present within said second fluid exhaust stream;
wherein said first supply fluid is a fuel stream and said first tracer is selected from the group consisting of methane and sulfur hexafluoride.

17. A fuel cell apparatus comprising:
(a) a fuel cell assembly comprising:
an anode, a cathode, and a solid polymer electrolyte interposed therebetween;
a fuel passage fluidly associated with said anode;
an oxidant passage fluidly associated with said cathode;
a coolant passage for directing a coolant fluid in thermal communication with said fuel cell;
(b) a fuel supply fluidly connected to said fuel passage for directing a fuel fluid through said fuel passage;
(c) an oxidant supply fluidly connected to said oxidant passage for directing an oxidant fluid through said oxidant passage;
(d) a coolant supply fluidly connected to said coolant passage for directing a coolant fluid therethrough;
(e) a tracer supply fluidly connected to at least one of said fuel, oxidant and coolant passages for introducing a tracer into a receiving fluid, said receiving fluid being one of said fuel fluid, said oxidant fluid and said coolant fluid;
(f) a first tracer detector in fluid contact with a first end of a monitored fluid passage, said monitored fluid passage being at least one of said fuel, oxidant and coolant passages, said detector detecting when a concentration of said tracer is present within said monitored fluid passage and emitting a first output signal when said concentration is detected;
(g) a second tracer detector in fluid contact with a second end of a monitored fluid passage, said second end being other than said first end and opposite thereto, said monitored fluid passage being at least one of said fuel, oxidant and coolant passages, said detector detecting when a concentration of said tracer is present within said monitored fluid passage and emitting a second output signal when said concentration is detected.

18. The fuel cell apparatus of claim 17 wherein at least one of said first and second output signals are representative of said concentration.

19. The fuel cell apparatus of claim 17 further comprising a metering device located between said tracer supply and a location where said tracer is introduced to said receiving fluid, for controlling the introduction of said tracer to said receiving fluid.

20. The fuel cell apparatus of claim 17 wherein said tracer supply comprises a pressure vessel for containing said tracer.

21. The cell apparatus of claim 17 further comprising a pump or compressor located downstream of said tracer supply for controlling the pressure of said tracer prior to introduction to said receiving fluid.

22. The fuel cell apparatus of claim 17 further comprising an injector located where said tracer is introduced to said receiving fluid, for introducing said tracer into said receiving fluid.

23. The fuel cell apparatus of claim 17 further comprising a mixer located where said tracer is introduced to said receiving fluid, for mixing said tracer with said receiving fluid.

24. The fuel cell apparatus of claim 17 wherein said second output signal is representative of said concentration.

25. The fuel cell apparatus of claim 17 further comprising three tracer detectors, such that one tracer detector is associated with each one of said fuel, oxidant and coolant passages.

26. The fuel cell apparatus of claim 25 further comprising valves for periodically introducing said tracer into at least two different ones of said fuel, oxidant and coolant passages.

27. The fuel cell apparatus of claim 17 wherein said tracer supply is detachable.

28. The fuel cell apparatus of claim 17 wherein at least one of said first and second tracer detectors is detachable.

29. A method of detecting a leak within a fuel cell which is not producing power, said method comprising:
(a) sealing fluid inlets and outlets of a first fluid passage of said cell;
(b) introducing a tracer into said first fluid passage of said fuel cell; and
(c) monitoring an environment which, in the absence of a fluid leak in said first fluid passage, is fluidly isolated from said first fluid passage and detecting when a concentration of said tracer is present within said environment,
wherein said tracer is diluted by mixing said tracer with an unreactive fluid.

30. The method of claim 29 wherein said tracer is introduced until fluid pressure within said first fluid passage is about the same as anticipated pressure within said first fluid passage when said fuel cell will be operating to produce power.

31. The method of claim 30 wherein said environment is a second fluid passage of said fuel cell, and wherein a fluid other than said tracer is introduced into said second fluid passage until fluid pressure within said second passage is about the same as anticipated pressure within said second fluid passage when said fuel cell will be operating to produce power.

32. The method of claim 29 further comprising placing said fuel cell within a vacuum chamber wherein said environment is the interior of said vacuum chamber.

33. The method of claim 29 wherein said first tracer is selected from the group consisting of nitrogen, sulphur hexafluoride, and methane.

34. A fuel cell apparatus comprising:
(a) a fuel cell comprising an anode, a cathode, and an electrolyte interposed therebetween;
(b) a fuel passage fluidly connected to said fuel cell for directing a fuel fluid to and from the anode thereof, said fuel passage having a supply portion and an exhaust portion;

(c) an oxidant passage fluidly connected to said fuel cell for directing an oxidant fluid to and from the cathode thereof, said oxidant passage having a supply portion and an exhaust portion;

(d) a coolant passage for directing a coolant fluid in thermal communication with said fuel cell, said coolant passage having a supply portion and an exhaust portion;

(e) a tracer supply fluidly connected to each of said fuel passage, oxidant passage and coolant passage for directing a tracer fluid into at least one of said fuel passage, oxidant passage and coolant passage;

(f) a first tracer detector in fluid contact with said exhaust portion of said fuel passage;

(g) a second tracer detector in fluid contact with said exhaust portion of said oxidant passage; and (h) a third tracer detector in fluid contact with said exhaust portion of said coolant passage.

35. The fuel cell apparatus of claim 34, further comprising first, second and third valves fluidly connected to said tracer supply, said first valve for directing said tracer fluid to said fuel passage, said second valve for directing said tracer fluid to said oxidant passage, and said third valve for directing said tracer fluid to said coolant passage.

36. The fuel cell apparatus of claim 34, further comprising a flow diverter fluidly connected to said tracer supply for directing said tracer fluid into at least one of said fuel passage, oxidant passage and coolant passage.

37. The fuel cell apparatus of claim 34 wherein said tracer supply is adapted to periodically direct said tracer fluid into each of said fuel passage, oxidant passage and coolant passage.

38. A fuel cell apparatus comprising:

(a) a fuel cell assembly comprising:
an anode, a cathode, and an electrolyte interposed therebetween;
a fuel passage fluidly associated with said anode;
an oxidant passage fluidly associated with said cathode;
a coolant passage for directing a coolant fluid in thermal communication with said fuel cell;

(b) a fuel supply fluidly connected to said fuel passage for directing a fuel fluid through said fuel passage;

(c) an oxidant supply fluidly connected to said oxidant passage for directing an oxidant fluid through said oxidant passage;

(d) at least one of said fuel and oxidant supplies provides for fluid flow in two directions;

(e) a coolant supply fluidly connected to said coolant passage for directing a coolant fluid therethrough;

(f) a tracer supply fluidly connected to at least one of said fuel, oxidant and coolant passages for introducing a tracer into a receiving fluid, said receiving fluid being one of said fuel fluid, said oxidant fluid and said coolant fluid;

(g) a first tracer detector in fluid contact with a first end of a monitored fluid passage, said monitored fluid passage being at least one of said fuel, oxidant and coolant passages, said detector detecting when a concentration of said tracer is present within said monitored fluid passage and emitting a first output signal when said concentration is detected; and (h) a second tracer detector in fluid contact with a second end of a monitored fluid passage, said second end being other than said first end and opposite thereto, said monitored fluid passage being at least one of said fuel, oxidant and coolant passages, said detector detecting when a concentration of said tracer is present within said monitored fluid passage and emitting a second output signal when said concentration is detected.

* * * * *